United States Patent
Chen et al.

(10) Patent No.: US 11,659,486 B2
(45) Date of Patent: May 23, 2023

(54) WIRELESS COMMUNICATION METHOD WITH ADAPTIVE POWER CONTROL MECHANISM AND ASSOCIATED CIRCUITRY WITHIN ELECTRONIC DEVICE

(71) Applicant: MEDIATEK INC., Hsin-Chu (TW)

(72) Inventors: Li-Wei Chen, Hsin-Chu (TW); Shun-Yong Huang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 35 days.

(21) Appl. No.: 16/787,036

(22) Filed: Feb. 11, 2020

(65) Prior Publication Data
US 2021/0250858 A1    Aug. 12, 2021

(51) Int. Cl.
H04W 52/02 (2009.01)
H04W 4/70 (2018.01)
H04W 72/0446 (2023.01)
H04W 72/04 (2023.01)

(52) U.S. Cl.
CPC ........ H04W 52/0216 (2013.01); H04W 4/70 (2018.02); H04W 52/0274 (2013.01); H04W 72/042 (2013.01); H04W 72/0446 (2013.01)

(58) Field of Classification Search
CPC ......... H04W 52/0216; H04W 52/0229; H04W 72/1205; H04W 72/1289; H04W 52/0219; H04W 4/70; H04W 52/0274; H04W 72/042; H04W 72/0446; Y02D 30/70
See application file for complete search history.

(56) References Cited

U.S. PATENT DOCUMENTS

| | | | |
|---|---|---|---|
| 2019/0045438 A1* | 2/2019 | Cariou | H04W 52/0216 |
| 2019/0053155 A1* | 2/2019 | Kneckt | H04W 52/0216 |
| 2020/0296749 A1* | 9/2020 | Freda | H04W 28/0268 |
| 2021/0044511 A1* | 2/2021 | Connolly | H04L 43/50 |
| 2021/0076251 A1* | 3/2021 | Ho | H04L 65/1059 |

FOREIGN PATENT DOCUMENTS

| | | |
|---|---|---|
| WO | 2014/066652 A1 | 5/2014 |
| WO | 2018/033659 A1 | 2/2018 |

* cited by examiner

*Primary Examiner* — Mansour Oveissi
(74) *Attorney, Agent, or Firm* — Winston Hsu

(57) ABSTRACT

The present invention provides a wireless communication method of an electronic device, wherein the wireless communication method includes the steps of: building a link with peer electronic device; receiving downlink data information from the peer electronic device; referring to the downlink data information to determine wake and doze information of the electronic device; and transmitting the wake and doze information of the electronic device to the peer electronic device.

12 Claims, 5 Drawing Sheets

WIRELESS COMMUNICATION METHOD WITH ADAPTIVE POWER CONTROL MECHANISM AND ASSOCIATED CIRCUITRY WITHIN ELECTRONIC DEVICE

BACKGROUND

In a wireless network infrastructure, a station may enter a doze state and notify an access point when the station does not have any wireless traffic within a specific period. In some applications whose wireless traffic has low throughput and smaller period, such as ping or gaming synchronization, the station is unable to enter the doze state because the station needs to receive the packets whose intervals are always smaller than the specific period.

IEEE 802.11 ah specification and IEEE 802.11ax specification provide a target wake time (TWT) protocol to permit the access point and the station to exchange information that includes expected activity duration, and the station may enter the doze state based on this information to reduce the power consumption. However, using the TWT mechanism may have some problems. If the wake time set by the TWT mechanism is not enough, the access point may not transmit all of the packets to the station. In addition, the access point needs to aggregate and buffer the data when the station is at the doze state, and the data latency may be worsened if the doze time of the station is too long.

Because the user always expects to be able to use the electronic device (e.g. play games) smoothly, and reduce the power consumption of the electronic device as much as possible, how to provide a control mechanism to reduce the data latency while maintaining the power saving effect is an important topic.

SUMMARY

It is therefore an objective of the present invention to provide wireless communication method with adaptive power control mechanism, which can reduce the data latency while maintaining the power saving effect, to solve the above-mentioned problems.

According to one embodiment of the present invention, a wireless communication method of an electronic device is disclosed, and the wireless communication method comprises the steps of: building a link with a peer electronic device; receiving downlink data information from the peer electronic device; referring to the downlink data information to determine wake and doze information of the electronic device; and transmitting the wake and doze information to the peer electronic device.

According to another embodiment of the present invention, a wireless communication method of an electronic device is disclosed, wherein the wireless communication method comprises the steps of: building a link with a peer electronic device; receiving a wake and doze information from the electronic device; and referring to the wake and doze information to transmit downlink data information to the peer electronic device in a wake interval, wherein the downlink data information comprises information about data buffered in a queue of the electronic device in a doze interval of the peer electronic device.

According to another embodiment of the present invention, a circuitry within an electronic device is disclosed, wherein the circuitry is configured to perform the steps of: building a link with a peer electronic device; receiving downlink data information from the peer electronic device; referring to the downlink data information to determine wake and doze information of the electronic device; and transmitting the wake and doze information of the electronic device to the peer electronic device.

According to another embodiment of the present invention, a circuitry within an electronic device is disclosed, wherein the circuitry is configured to perform the steps of: building a link with a peer electronic device; receiving a wake and doze information from the peer electronic device; and referring to the wake and doze information to transmit downlink data information to the peer electronic device in a wake interval of the peer electronic device, wherein the downlink data information comprises information about data buffered in a queue of the electronic device in a doze interval of the peer electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
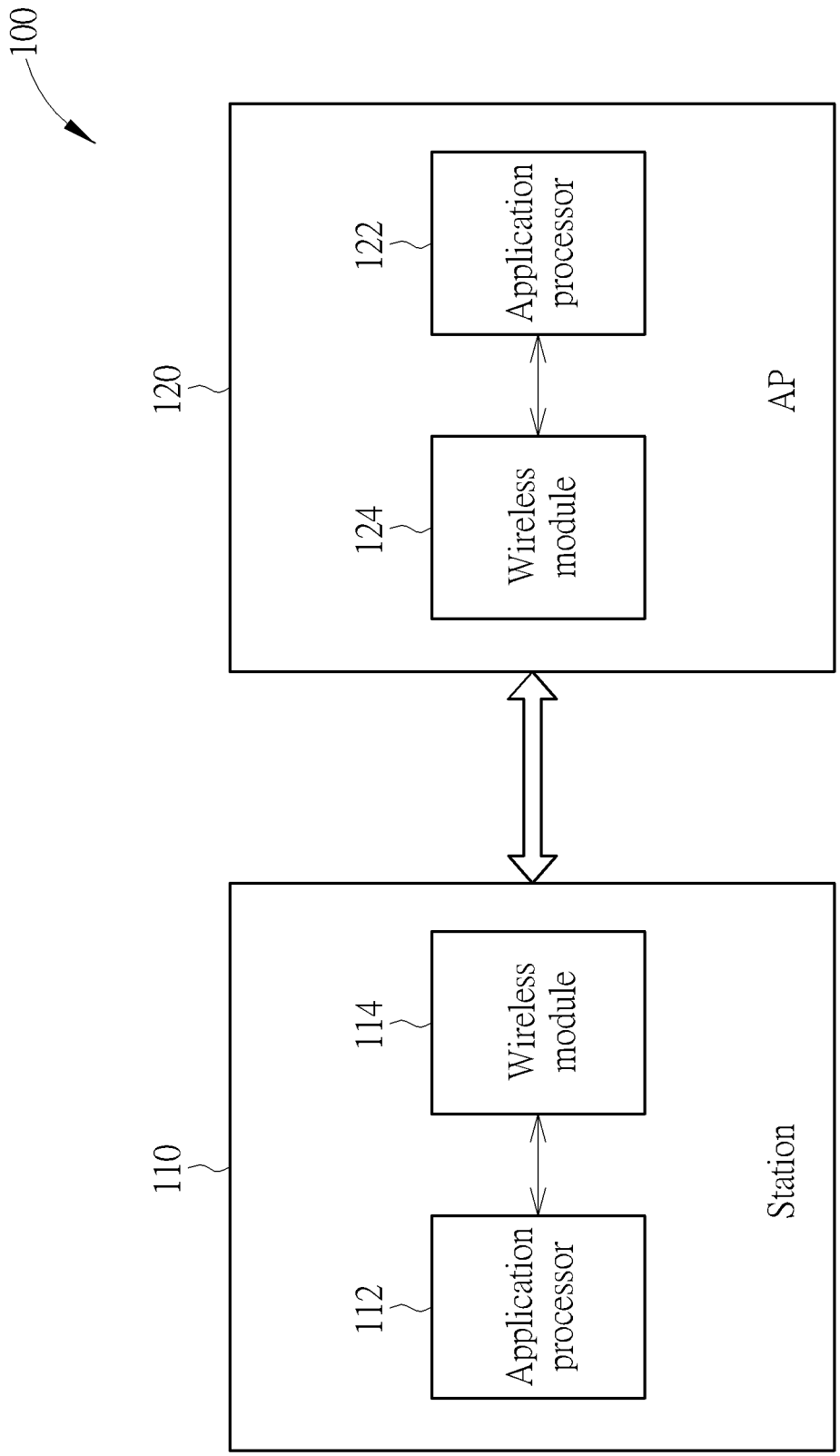
FIG. 1 is a diagram illustrating a wireless communication system according to one embodiment of the present invention.

FIG. 1 is a diagram illustrating a wireless communication system 100 according to one embodiment of the present invention. As shown in FIG. 1, the wireless communication system 100 comprises two electronic devices capable of wirelessly communicating to each other (in this embodiment, the peer electronic devices are a station 110 and an access point (AP) 120), wherein the station 110 comprises an application processor 112 and a wireless module 114 comprising a Wi-Fi interface, and the AP 110 comprises an application processor 122 and a wireless module 124 comprising a Wi-Fi interface. In this embodiment, the station 110 can be a cell phone, a tablet, a notebook, or any other portable electronic device capable of communicating with the AP 120.

In the wireless communication system 100, the station 110 and the AP 120 supports the TWT mechanism in the IEEE 802.11 ah specification and IEEE 802.11ax specification. To increase the efficiency of the TWT mechanism, this embodiment provides an adaptive power control mechanism to optimize the data latency and the power saving. Specifically, the AP 120 is configured to provide downlink data information to the station 110, wherein the downlink data information may comprise amount of data that is prepared to be transmitted to the station 110 and is buffered by in the AP 120; and the downlink data information may further comprise time information about data staying in a queue of the AP 120, for example, an average buffering time of data that staying in the queue of the AP 120. The station 110 can determine wake and doze information based on the downlink data information provided by the AP 120 and the uplink data information obtained in its application processor 112, wherein the wake and doze information may comprise a TWT period, a wake interval, a doze interval, a ratio about the wake interval (e.g. the ratio between the wake interval and the TWT period), or a ratio about the doze interval (e.g. the ratio between the wake interval and the TWT period) used by the station 110; and the wake and doze information is sent to the AP 120. Then, the AP 120 refers to the wake and doze information of the station 110 to send the buffered packets to the station 110 in the appropriate periods (i.e. the wake interval of the station 110).

Figure 2:
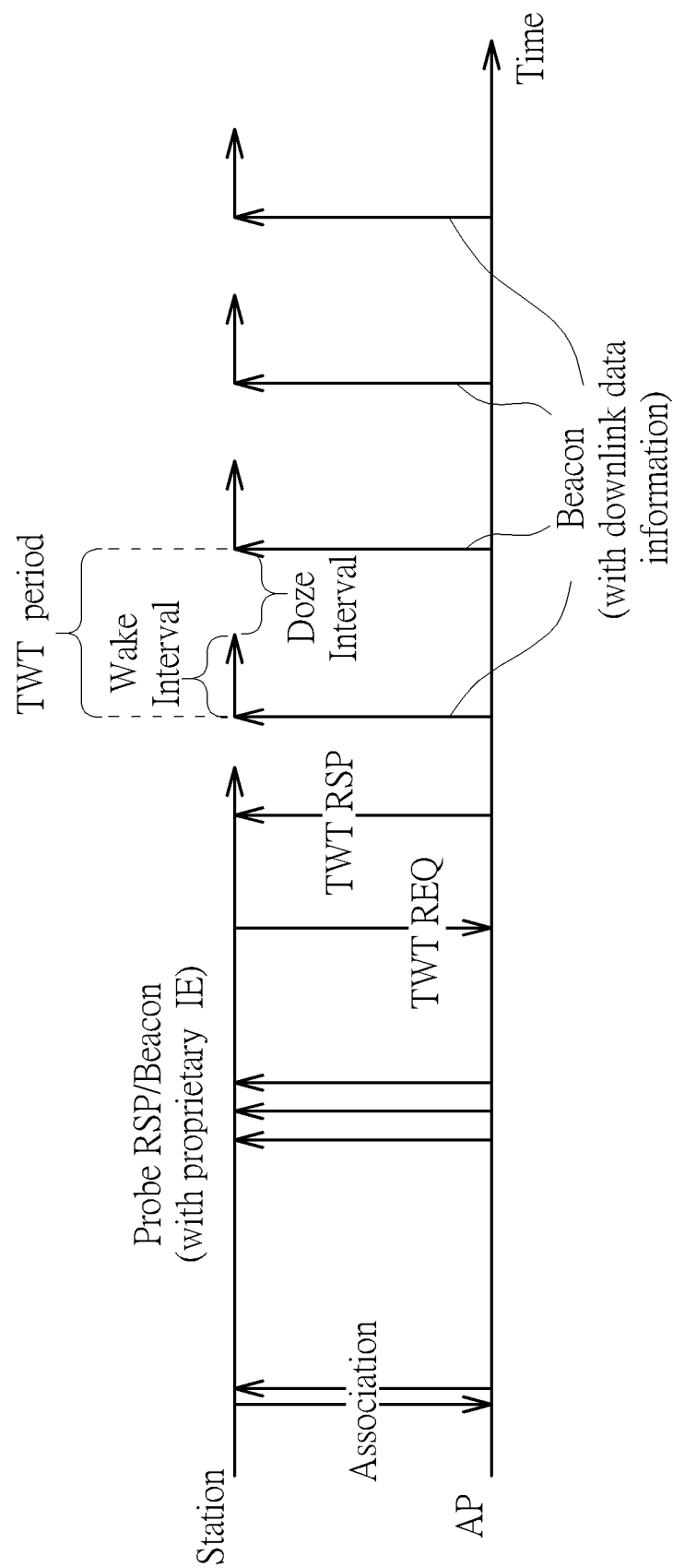
FIG. 2 shows a flow and a timing diagram of the station and the AP.
Figure 3:
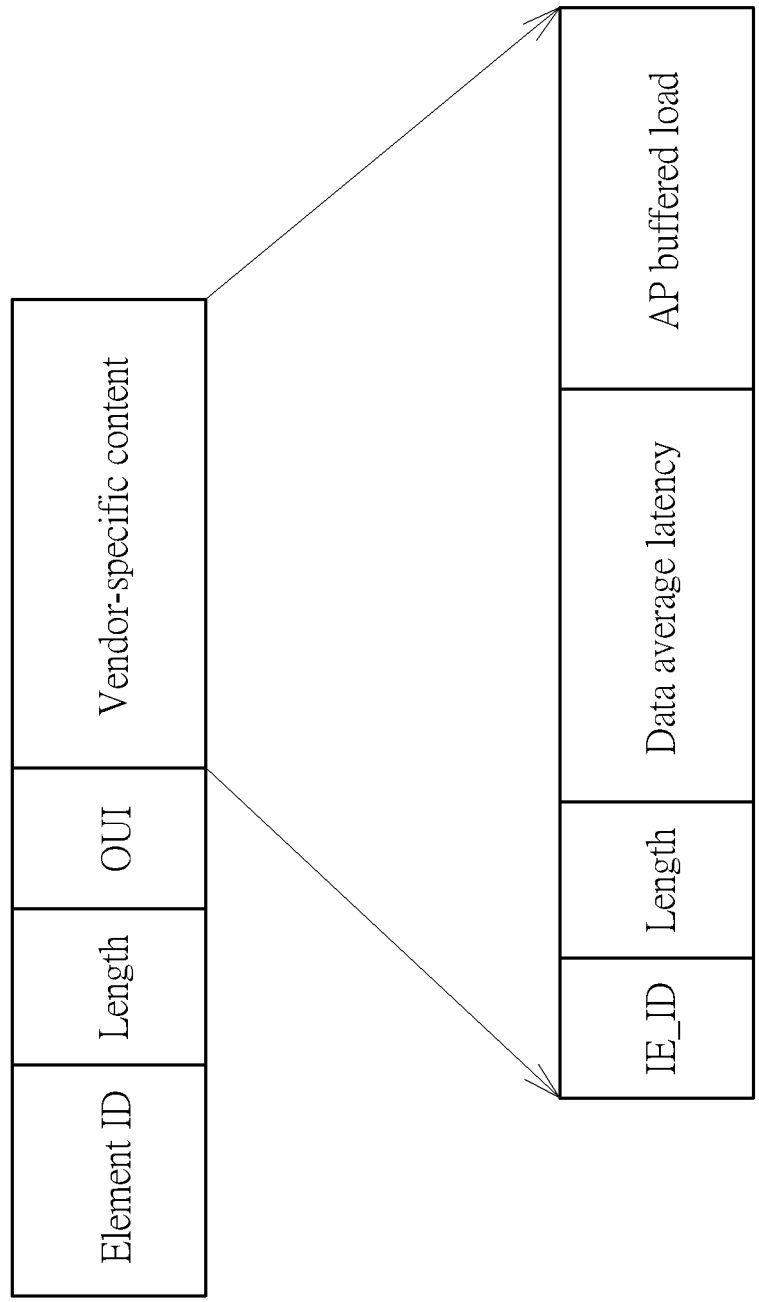
FIG. 3 shows a beacon or a probe response frame comprising downlink data information according to one embodiment of the present invention.

FIG. 2 shows a flow and a timing diagram of the station 110 and the AP 120. Initially, the station 110 and the AP 120 build a link and create an association, and confirm that both the station 110 and the AP 120 support the adaptive power control mechanism provided by this embodiment. At this time, the station 110 may start to transmit packets to the AP 120 and receive packets from the AP 120. Then, the AP 120 transmits one or more beacons or probe response frames to the station 110, wherein each beacon or probe response frame may have the information as shown in FIG. 3. As shown in FIG. 3, the each beacon or probe response frame comprises an element identity (ID), a length of the beacon, an organizationally unique identifier (OUI) and a vendor-specific content, where the vendor-specific content comprises IE_ID, a length of the vendor-specific content, a data average latency and an AP buffered load. In this embodiment, the data average latency and the AP buffered load are regarded as the downlink data information, and the data average latency can be obtained by calculating the average buffering time of data that staying in the queue of the AP 120, and the AP buffered load is amount of data that is prepared to be transmitted to the station 110 and is buffered by in the AP 120.

Figure 4:
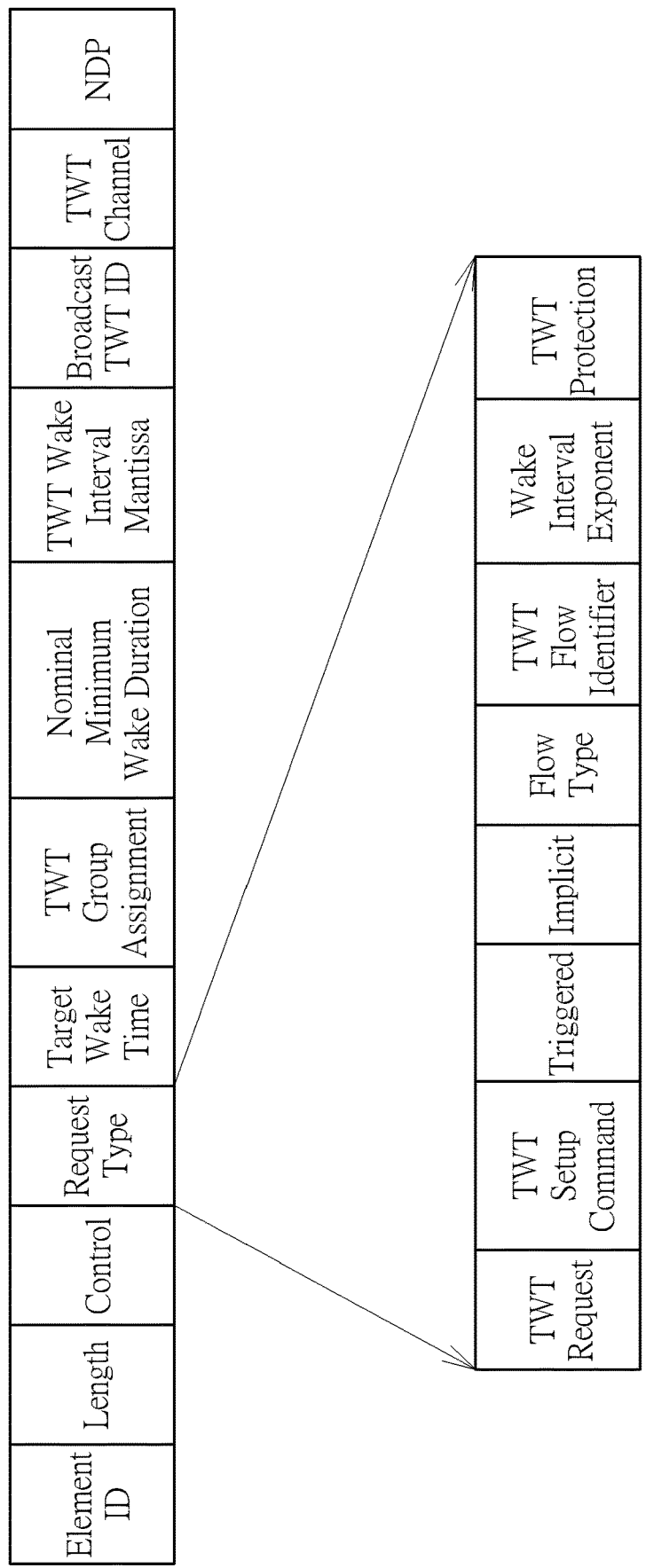
FIG. 4 shows a TWT request comprising the wake and doze information according to one embodiment of the present invention.

After receiving the one or more beacons or probe response frames from the AP 120, the station 110 determines the wake and doze information based on the downlink data information provided by the AP 120 and the uplink data information obtained in its application processor 112, wherein the wake and doze information may comprise a TWT period, a wake interval, a doze interval, a ratio about the wake interval, or a ratio about the doze interval used by the station 110, and the station 110 sends a TWT request comprising the wake and doze information to the AP 120. FIG. 4 shows the TWT request according to one embodiment of the present invention. As shown in FIG. 4, the TWT request may comprise the element ID, a length of the TWT request, a control symbol, a request type, a target wake time, a TWT group assignment, a nominal minimum wake duration, TWT wake interval mantissa, broadcast TWT ID, TWT channel and a data packet paging (NDP), wherein the request type may comprise a TWT request, a TWT setup command, triggered information, implicit information, a flow type, a TWT flow identifier, a wake interval exponent and a TWT protection. In this embodiment, the wake and doze information is included in one or more fields shown in FIG. 4.

After receiving the TWT request from the station 110, the AP 120 sends a TWT response to the station 110, and the station 110 starts to use the wake and doze information to periodically enter the normal state (i.e. wake interval) and doze state as shown in FIG. 1.

Figure 5:
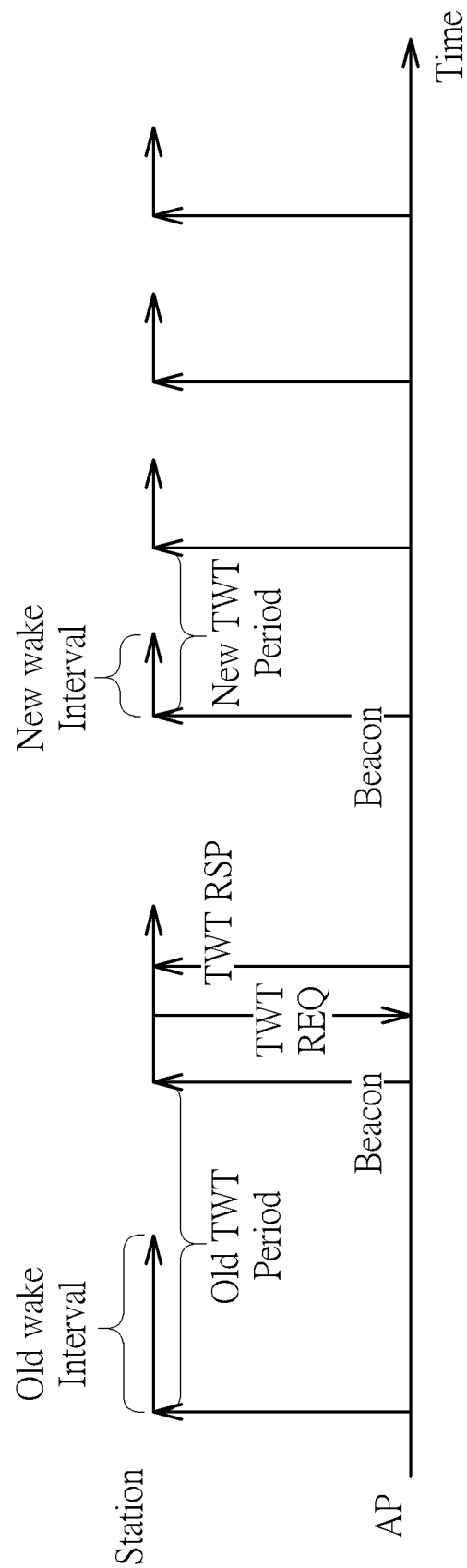
FIG. 5 shows a flow and a timing diagram when the station updates the wake and doze information.

In one embodiment, the AP 120 may periodically send the downlink data information to the station 110, for the station 110 determining if updating the wake and doze information. For example, every time the station 110 enters the normal state, the AP 120 may send the beacon comprising the latest downlink data information to the station 110. Specifically, referring to FIG. 5, the station 110 and the AP 120 have already used the TWT mechanism to communicate with each other, where the TWT period and the wake interval used by the station 110 are marked as "old TWT period" and "old wake interval", respectively. The AP 120 periodically sends the beacon having the latest downlink data information to the station 110. Once the station 110 determines that the amount of data buffered by the AP 120 is greater than a threshold, and/or the average buffering time of data that staying in the queue of the AP 120 increases, and/or the uplink data amount (i.e. the data to be transmitted from the station 110 to the AP 120) becomes more, the station 110 can determine new wake and doze information, wherein the new wake and doze information may comprise a shorter TWT period, a longer wake interval, a shorter doze interval, a greater ratio about the wake interval, or a smaller ratio about the doze interval, or any combination. Similarly, once the station 110 determines that the amount of data buffered by the AP 120 is less than a threshold, and/or the average buffering time of data that staying in the queue of the AP 120 decreases, and/or the uplink data amount (i.e. the data to be transmitted from the station 110 to the AP 120) becomes less, the station 110 can determine new wake and doze information, wherein the new wake and doze information may comprise a longer TWT period, a shorter wake interval, a longer doze interval, a smaller ratio about the wake interval, or a greater ratio about the doze interval, or any combination. Then, the station 110 sends the TWT request comprising the new wake and doze information to the AP 120. After receiving the TWT request from the station 110, the AP 120 sends the TWT response to the station 110, and the station 110 starts to use the new wake and doze information to periodically enter the normal state (i.e. the new wake interval) and doze state as shown in FIG. 5.

Briefly summarized, in the wireless communication method with adaptive power control mechanism, the AP can periodically send the downlink data information to the station, for the station determining if updating the TWT period or the wake interval; and the station can also send the wake and doze information to the AP, for the AP sending the packets to the station in the appropriate time. By using the wireless communication method of the present invention, the data latency can be reduced while maintaining the power saving effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of an electronic device, comprising:
building a link with a peer electronic device;
receiving downlink data information from the peer electronic device;
referring to the downlink data information to determine wake and doze information of the electronic device; and
transmitting the wake and doze information of the electronic device to the peer electronic device;
wherein the step of receiving the downlink data information from the peer electronic device comprises:
receiving a beacon or a probe response frame from the peer electronic device, wherein the beacon or the probe response frame records a data average latency serving as the downlink data information, and the data average latency is calculated based on length of time of data staying in the queue of the peer electronic device.

2. The wireless communication method of claim 1, wherein the downlink data information comprises an average buffering time that the data stays in the queue of the peer electronic device.

3. The wireless communication method of claim 1, wherein the wake and doze information comprises a wake interval, a doze interval, a ratio about the wake interval, or a ratio about the doze interval.

4. The wireless communication method of claim 1, wherein before receiving the downlink data information from the peer electronic device, the electronic device uses a first wake interval and a first doze interval to control an enablement and a disablement of a transmission/reception of the electronic device; and the electronic device refers to the downlink data information to determine the wake and doze information comprising a second wake interval and a second doze interval, wherein the second wake interval is different from the first wake interval, and/or the second doze interval is different from the first doze interval; and the wireless communication method further comprises:
receiving an acknowledge from the peer electronic device, wherein the acknowledge is in response to the wake and doze information; and
using the second wake interval and the second doze interval to control the enablement and the disablement of the transmission/reception of the electronic device.

5. A wireless communication method of an electronic device, comprising:
building a link with a peer electronic device;
receiving a wake and doze information from the electronic device; and
referring to the wake and doze information to transmit downlink data information to the peer electronic device in a wake interval of the peer electronic device, wherein the downlink data information comprises information about data buffered in a queue of the electronic device due to a doze interval of the peer electronic device;
wherein the step of referring to the wake and doze information to transmit the downlink data information to the peer electronic device in the wake interval of the peer electronic device comprises:
referring to the wake and doze information to transmit a beacon or a probe response frame to the peer electronic device, wherein the beacon or the probe response frame records a data average latency serving as the downlink data information, and the data average latency is calculated based on length of time of data staying in the queue of the electronic device.

6. The wireless communication method of claim 5, wherein the downlink data information comprises an average buffering time that the data stays in the queue of the electronic device.

7. A circuitry within an electronic device, configured to perform the steps of:
building a link with a peer electronic device;
receiving downlink data information from the peer electronic device;
referring to the downlink data information to determine wake and doze information of the electronic device; and
transmitting the wake and doze information of the electronic device to the peer electronic device;
wherein the step of receiving the downlink data information from the peer electronic device comprises:
receiving a beacon or a probe response frame from the peer electronic device, wherein the beacon or the probe response frame records a data average latency serving as the downlink data information, and the data average latency is calculated based on length of time of data staying in the queue of the peer electronic device.

8. The circuitry of claim 7, wherein the downlink data information comprises an average buffering time that the data stays in the queue of the peer electronic device.

9. The circuitry of claim 7, wherein the wake and doze information comprises a wake interval, a doze interval, a ratio about the wake interval, or a ratio about the doze interval.

10. The circuitry of claim 7, wherein before receiving the downlink data information from the peer electronic device, the electronic device uses a first wake interval and a first doze interval to control an enablement and a disablement of a transmission/reception of the electronic device; and the electronic device refers to the downlink data information to determine the wake and doze information comprising a second wake interval and a second doze interval, wherein the second wake interval is different from the first wake interval, and/or the second doze interval is different from the first doze interval; and the wireless communication method further comprises:
receiving an acknowledge from the peer electronic device, wherein the acknowledge is in response to the wake and doze information; and
using the second wake interval and the second doze interval to control the enablement and the disablement of the transmission/reception of the electronic device.

11. A circuitry within an electronic device, configured to perform the steps of:
building a link with a peer electronic device;
receiving a wake and doze information from the electronic device; and
referring to the wake and doze information to transmit downlink data information to the peer electronic device in a wake interval of the peer electronic device, wherein the downlink data information comprises information about data buffered in a queue of the electronic device due to a doze interval of the peer electronic device;
wherein the step of referring to the wake and doze information to transmit the downlink data information to the peer electronic device in the wake interval of the peer electronic device comprises:
referring to the wake and doze information to transmit a beacon or a probe response frame to the peer electronic device, wherein the beacon or the probe response frame records a data average latency serving as the downlink data information, and the data average latency is calculated based on length of time of data staying in the queue of the electronic device.

12. The circuitry of claim 11, wherein the downlink data information comprises an average buffering time that the data stays in the queue of the electronic device.

* * * * *